Patented Oct. 12, 1926.

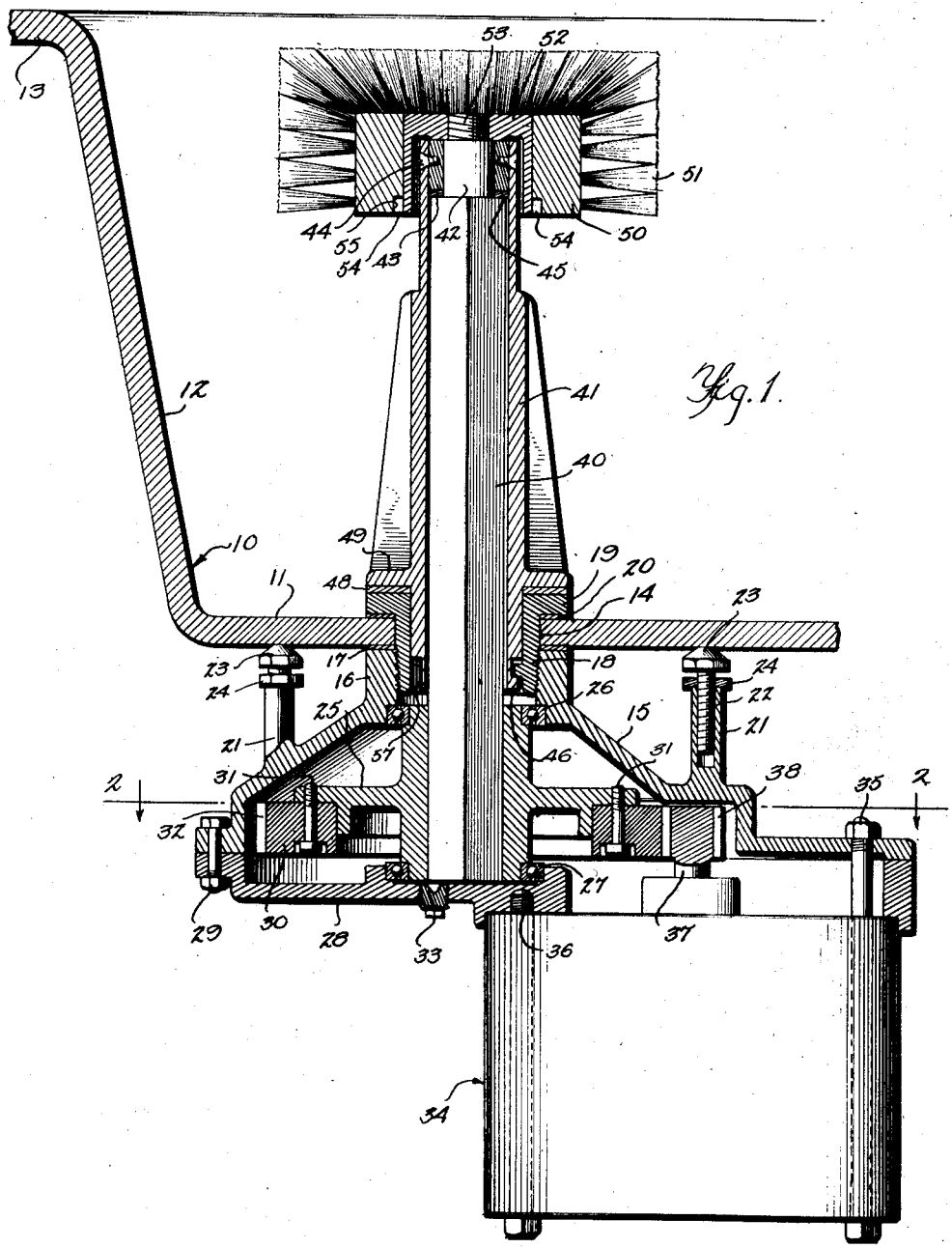

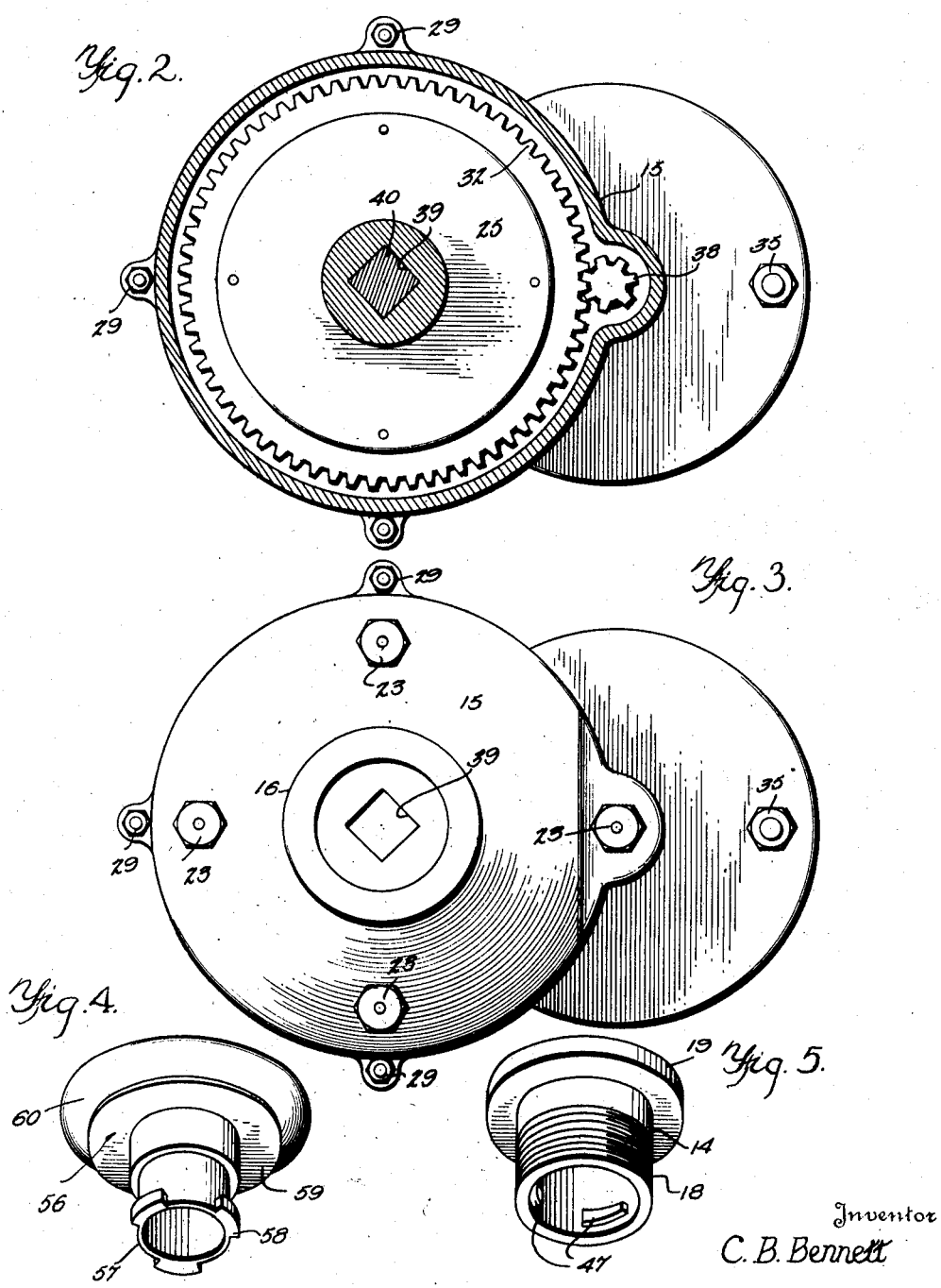

1,602,742

UNITED STATES PATENT OFFICE.

CHARLES B. BENNETT, OF LOUISVILLE, KENTUCKY.

SCOURING ATTACHMENT.

Application filed April 11, 1924. Serial No. 705,890.

This invention relates to scouring attachments for kitchen sinks and more particularly to a motor driven attachment having an operating element arranged within the kitchen sink and adapted for scouring dishes of various kinds.

An important object of the invention is to provide a rotatable shaft having one end arranged within the sink and adapted to carry an operating element and its opposite end projecting through an opening in the sink for driving connection with any suitable source of power.

A further object of the invention is the provision of a device of the above mentioned character wherein the drive shaft which carries the operating element is readily removable from its driving connections, a novel form of plug being provided for closing the opening through which the shaft normally projects when the device is not in operation.

A further object is the provision of a scouring device employing a gear casing secured outwardly of a sink and having an operating shaft projecting through the opening therein, the gear casing being secured to the sink through an opening therein and being provided with means engaging the sink for further supporting the gear casing and other operating parts.

Other objects and advantages of the invention will be apparent during the course of the following description.

In the drawings I have shown one embodiment of the invention. In this showing,

Figure 1 is a central vertical sectional view, parts being shown in elevation,

Figure 2 is a section on line 2—2 of Figure 1,

Figure 3 is a plan view of the gear casing and associated elements removed,

Figure 4 is a detail perspective of the closure plug, and,

Figure 5 is a similar view of the scouring nipple.

Referring to the drawings, the numeral 10 designates a kitchen sink, as a whole, of the usual type having a bottom 11, side walls 12 and a horizontal outwardly extending flange 13 at its upper end. The sink is provided with a suitable opening 14 which may be arranged in the bottom of the sink.

A gear casing 15 is arranged outwardly of the sink and has a substantially central collar portion 16 arranged adjacent and surrounding the opening 14. A suitable gasket 17 is arranged between the collar 16 and the wall of the sink adjacent the opening therein. The collar 16 is internally threaded to receive the threaded portion 18 of a nipple having a collar 19 at its upper end arranged within the sink. A gasket 20 is arranged between the collar 19 and the inner wall of the sink to prevent leakage around the nipple as will be obvious. It is apparent that by tightening the nipple within the collar 16 the gear casing 15 may be secured in place against the sink. The gear casing is further provided with a plurality of upwardly extending integral tubular portions 21 internally threaded to receive the lower ends of screw jack 22 having engaging heads 23 at their upper ends. As shown in Figure 1, the heads 23 are adapted to engage an outer wall of the sink and lock nuts 24 are provided for locking the jack screws in desired position.

A drive member 25 is arranged within the gear casing 15 and is journaled at its upper end in a bearing 26 carried by the gear casing. The lower end of the member 25 is journaled in suitable bearings 27 carried by a bottom cover plate 28 secured by bolts or the like 29 to the gear casing. A ring gear 30 is secured by screws 31 or similar fastening elements to the driving member 25. The ring gear 30 is provided with gear teeth 32 and the gear is preferably formed of molded composition whereby silence in operation is obtained. The cover plate 28 is provided with a drain plug 33 whereby any water which may find its way into the gear casing may be drained out.

The numeral 34 designates an electric motor secured to the casing 15 and cover plate 28 by bolts 35 and 36 respectively. The motor is provided with an upwardly extending shaft 37 having a pinion 38 at its upper end meshing with the teeth of the ring gear 30.

The drive member 25 is provided with a polygonal axial opening 39 as shown in Figures 2 and 3 for the reception of a similarly shaped vertical shaft 40. The shaft 40 extends upwardly into the sink through the opening 14 as clearly shown in Figure 1 and its upper end is arranged within a suitable supporting member 41. The upper end of the shaft 40 is provided with a reduced cylindrical portion 42 adapted to rotate within a bearing 43 carried within the upper end of the supporting member 41 and secured thereto by screws or the like 44. A washer 45 is arranged between the lower end of the bearing 43 and the upper end of the polygonal portion of the shaft 40 to serve as a thrust bearing. The lower end of the supporting member 41 is provided with a plurality of spaced cam lugs 46 adapted to engage similarly shaped lugs 47 formed integral with the nipple 18 as shown in Figures 1 and 5. The lower faces of the lugs 47 and the upper faces of the lugs 46 are so inclined that when the supporting member 41 is arranged in position and rotated through a portion of a circle the adjacent faces of the lugs will engage with each other to draw the supporting member down tightly against a gasket 48 arranged between the upper face of the collar 30 and the lower face of an annular flange 49 formed integral with the supporting member 41.

The numeral 50 designates the body portion of an operating element shown in the present instance as a brush 51. The operating element is provided with a central preferably metallic sleeve 52 secured at its upper end to a threaded portion 53 formed on the upper end of the shaft 40. The under side of the sleeve 52 contacts with the upper edge of the bearing 43 to form a bearing support for the operating element. The sleeve 52 is provided with a plurality of lugs 54 adapted to engage within openings 55 in the operating element 50 to positively drive the latter when the shaft 40 is revolved.

The lower end of the shaft 40 is slidably mounted within the driving member 25 and is adapted to be withdrawn upwardly therefrom when the supporting member 41 is removed from the nipple 18. I provide means for preventing water or other material from the sink from flowing downwardly into the gear casing when the shaft 40 and associated elements are removed. As shown in Figure 4, the numeral 56 designates a plug as a whole having a depending sleeve 57 provided with a plurality of lugs 58 similar in construction to the lugs 46. The sleeve 57 is adapted for insertion within the nipple 18 and the lugs 58 are adapted to engage beneath the lugs 47 to maintain the plug in position as will be obvious. The plug 56 is provided with an engaging face 59 adapted to engage the gasket 48 when the plug is in place. The plug is further provided with an operating knob or handle 60 for convenience in operation.

The operation of the device is as follows:

In order to attach the device to a sink it is merely necessary to drill or otherwise cut the single opening 14 in one wall of the sink, preferably the bottom thereof. The collar 16 with the gasket 17 in place is then arranged against the bottom of the sink surrounding the opening 14. The gasket 20 is then placed in position and the nipple inserted within the opening 14 and the threads thereof engage with the threads of the collar 16. The collar 19 is preferably tightened with a suitable wrench so that a leak-proof joint will be provided between the nipple and the sides of the opening 14. The engaging heads 32 of the screw jacks 22 are then unscrewed until they tightly engage the lower wall of the sink whereupon the lock nuts 24 are tightened to prevent movement of the heads 23. It will be apparent that when this operation has been completed the gear casing and associated elements are securely held in place against the bottom of the sink. The lower end of the shaft 40 is then inserted within the driving member 25 and lowered therein until the lower end of the supporting member 41 reaches the position shown in Figure 1. It will be apparent that when the operating member is lowered in position the lugs 46 must be arranged between the lugs 47. When the lugs 46 are in proper position and the flange 49 in engagement with the gasket 48, the supporting member is turned until the lugs 46 and 47 are tightly engaged to prevent leakage between the nipple 18 and the supporting member 41. The device is now ready for operation by merely supplying current to the motor 34. Rotation of the shaft 37 and pinion 38 will be transmitted to the ring gear 30 and the rotating movement of the ring gear will be transmitted to the shaft 40 through the driving member 25 as will be obvious, to rotate the brush 51 or other element employed. I prefer to use gearing having a reduction ratio such that the rate of revolution of the brush or other element will not exceed approximately 350 revolutions per minute so that its centrifugal motion will not throw off an excessive amount of water, soap or the like when the device is in operation. As clearly shown in Figure 1, the upper extremity of the operating element is arranged beneath the upper edge of the sink so that any matter thrown off by the operating element due to its centrifugal motion will not be thrown outwardly from the sink when the device is in operation. Ordinarily I prefer to arrange the shaft 40 near one of the rear corners of the sink so that it will not interfere with other work performed in the sink. If it becomes desirable to remove the operating element however it is merely necessary to turn the supporting member 41 until the lugs 46 are released from the lugs 47 whereupon the supporting member and shaft may be removed from position. The plug 56 is then inserted in place of the shaft and lower end of the supporting member to prevent water or foreign matter in the sink from draining downwardly into the gear casing 15. While I have shown a brush connected to the upper end of the shaft 40 it will be apparent that any suitable operating element may be employed. To remove the member 50 from the sleeve 52 it is merely necessary to lift it upwardly to release the lugs 54 from the openings 55 in the member 50. I prefer to employ the threads 53 and the adjacent faces of the lugs 46 and 47 on a direction and pitch opposite to the rotation of the shaft 41 whereby the elements of the device will be tightened rather than loosened during the normal operation of the device.

It is to be understood that the form of my invention herewith shown and described is to be taken as a preferred example of the same and that various changes in the shape, size and arrangement of parts may be resorted to without departing from the spirit of the invention or the scope of the subjoined claims.

Having described my invention, I claim:

1. A device of the character described comprising a casing arranged beneath a sink having an opening formed therein, a nipple mounted in the opening in the sink and secured to said casing, a plurality of upwardly extending tubular members carried by said casing, a jack screw mounted within each of said tubular members and adapted to engage against the bottom of the sink, a driving member rotatably mounted in said casing and having an axial polygonal opening therein, means for rotating said driving member, a vertical shaft having a polygonal lower end slidably mounted in the opening in said driving member and having its upper end projecting into the sink through said nipple, and an operating element mounted on said shaft within the sink.

2. A device constructed in accordance with claim 1 wherein said nipple is provided interiorly with a plurality of spaced lugs having inclined lower faces, a supporting member having its lower end provided with a plurality of spaced lugs having inclined upper faces adapted to engage the lower faces of said first named lugs, said supporting member having a portion adapted to seat against the upper face of said nipple to provide a leak-proof joint, and a bearing mounted within said supporting member and rotatably receiving the upper end of said shaft.

3. A device of the character described comprising a casing adapted to be arranged beneath a sink having an opening in the bottom thereof, a driving member rotatably mounted in said casing, means for rotating said member, a shaft projecting through the opening in the sink and provided with a polygonal lower end, said driving member being provided with an axial polygonal opening adapted to slidably receive the lower end of said shaft, an operating element carried by said shaft within the sink, a nipple mounted in the opening in the sink and secured to said casing and surrounding said shaft, a supporting member having its lower end carried by and removably secured to said nipple, and a bearing mounted in the upper end of said supporting member and rotatably receiving said shaft.

4. A device of the character described comprising a casing arranged beneath a sink having an opening formed in the bottom thereof, a nipple mounted in the opening in the sink and secured to said casing, a rotatable shaft having its lower end arranged in said casing and its upper end projecting into the sink through the opening therein, means for rotating the lower end of said shaft, an operating element mounted on the upper end of said shaft, and a plurality of vertically movable members carried by said casing and adapted to engage against the bottom of the sink.

5. A device of the character described comprising a casing arranged beneath a sink having an opening formed on the bottom thereof, a nipple mounted in the opening in the sink, said nipple having a shoulder at its upper end arranged above the bottom of the sink and being provided with a depending tubular portion extending beneath the bottom of the sink and secured to said casing, a shaft having its lower end arranged in said casing and its upper end projecting into the sink through said nipple, means for rotating the lower end of said shaft, an operating element carried by the upper end of said shaft, and a plurality of vertically movable members carried by said casing remote from said shaft, each of said vertically movable members being provided with engaging heads at their upper ends adapted to engage against the bottom of the sink.

In testimony whereof I affix my signature.

CHARLES B. BENNETT.